(12) United States Patent
Pierce et al.

(10) Patent No.: US 9,886,876 B2
(45) Date of Patent: Feb. 6, 2018

(54) TRANSPORTABLE ROOF SAFETY TRAINING SYSTEMS AND METHODS

(71) Applicant: Pilot Catastrophe Services, Inc., Mobile, AL (US)

(72) Inventors: Michael Todd Pierce, Chunchula, AL (US); Charles E. Jones, Mobile, AL (US)

(73) Assignee: Pilot Catastrophe Services, Inc., Mobile, AL (US)

( * ) Notice: Subject to any disclaimer, the term of this patent is extended or adjusted under 35 U.S.C. 154(b) by 214 days.

(21) Appl. No.: 14/795,726

(22) Filed: Jul. 9, 2015

(65) Prior Publication Data

US 2017/0011660 A1 Jan. 12, 2017

(51) Int. Cl.
*G09B 19/00* (2006.01)
*G09B 25/04* (2006.01)
*B60P 3/14* (2006.01)

(52) U.S. Cl.
CPC ............ *G09B 25/04* (2013.01); *B60P 3/14* (2013.01); *G09B 19/00* (2013.01)

(58) Field of Classification Search
USPC ..... 434/72, 74, 79, 219, 226, 365; 52/64, 66
See application file for complete search history.

(56) References Cited

U.S. PATENT DOCUMENTS

| | | | | |
|---|---|---|---|---|
| 5,152,109 A | * | 10/1992 | Boers | E04H 3/24 296/26.02 |
| 5,173,052 A | * | 12/1992 | Duncan, Jr. | A62C 99/0081 296/168 |
| 5,752,835 A | * | 5/1998 | Whitmer, Sr. | G09B 19/00 434/226 |
| 6,799,975 B1 | * | 10/2004 | Dunn | G09B 19/00 434/219 |
| 7,901,212 B2 | * | 3/2011 | Quinn | A62C 99/0081 434/226 |
| 8,360,782 B1 | * | 1/2013 | Temple | G09B 19/00 434/226 |
| 8,435,039 B2 | * | 5/2013 | Paganini | A62C 99/0081 434/226 |
| 8,622,744 B2 | * | 1/2014 | Lumry | G09B 23/183 434/226 |
| 9,424,758 B2 | * | 8/2016 | Davis | G09B 19/00 434/226 |
| 2015/0132728 A1 | * | 5/2015 | Harding | B60G 11/27 434/226 |

* cited by examiner

*Primary Examiner* — Kurt Fernstrom
(74) *Attorney, Agent, or Firm* — Seed IP Law Group LLP

(57) ABSTRACT

According to principles of the embodiments as disclosed herein, a transportable roof safety training system with a trailer including a movable roof platform is provided which allows for mobile training of professionals who work on roofs. The transportable roof safety training system includes a roof platform mounted to a trailer. The roof platform may have an anti-slip coating on its upper surface and may be movable from a stowed position that has a low resistance to wind to one or more inclined positions that mimic the slope of a roof. A lift moves the roof between the various positions.

19 Claims, 7 Drawing Sheets

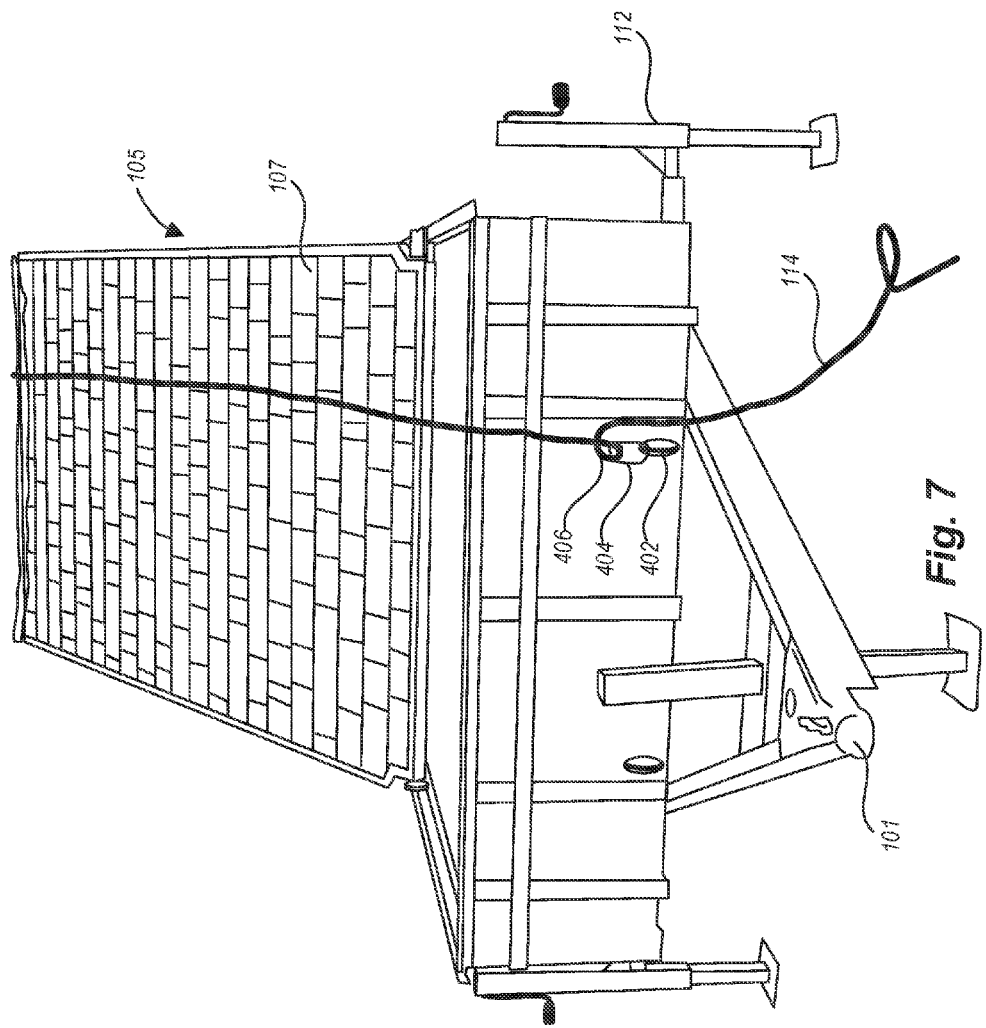

TRANSPORTABLE ROOF SAFETY TRAINING SYSTEMS AND METHODS

BACKGROUND

Technical Field

The present disclosure generally relates to systems and methods to teach people about roof safety and more particularly to a transportable, trailer mounted, roof for training and teaching people about roof safety.

Description of the Related Art

Roofers, insurance adjusters, home inspectors, and other professionals that work on roofs, in particular sloped roofs, are at risk of serious bodily harm when they are not safely trained to work on roofs and when they do not practice safe roof working procedures. Initial and follow-up training are important to keep people safe when working on roofs. In addition to classroom safety instruction and printed material, actual demonstrations and supervised practice of roof safety techniques help to properly train professions to safely work on roof tops.

The demonstration portion of training currently includes training on flat ground that lacks the inclined plane of a roof, using a steep surface on the ground or taking trainees onto actual roof structures high above the ground where new trainees are at risk of falling if they have not mastered safe roof techniques.

Some roof working professionals may go weeks or months without stepping on a roof and may forget their training. For example, some insurance adjusters may only inspect roofs during storm seasons and may never step on a roof between storm seasons. Many insurance adjustors may also travel long distances to visit storm damaged areas. Roof safety instructors will also travel to the storm damaged areas where they will try to find a suitable roof or other structure to train insurance adjusters in roof safety techniques.

The subject matter discussed in the Background section is not necessarily prior art and should not be assumed to be prior art merely as a result of its discussion in the Background section. Along these lines, any recognition of problems in the prior art discussed in Background section or associated with such subject matter should not be treated as prior art unless expressly stated to be prior art. Instead, the discussion of any subject matter in the Background section should be treated as part of the inventor's approach to the particular problem, which in and of itself may also be inventive.

BRIEF SUMMARY

According to principles of the embodiments as disclosed herein, a transportable roof safety training system with a trailer including a movable roof platform is provided which allows for mobile training of professionals who work on roofs. The transportable roof safety training system includes a roof platform mounted to a trailer. The roof platform may have an anti-slip coating on its upper surface and may be movable from a stowed position that has a low resistance to wind to one or more inclined positions that mimic the slope of a roof. A lift moves the roof between the various positions.

In one or more embodiments, the transportable roof safety training system may include a trailer frame that has a front end and a rear end. A trailer bed may be attached to the trailer frame. The trailer may also include at least one wheeled axle and a hitch coupled to the front end of the trailer frame and configured to couple to a trailer hitch.

The training system may also include a platform including a first portion and a second portion, the first portion having a first end rotatably coupled to the second portion and a second end rotatably coupled to the trailer. Roofing material may be mounted to an upper surface of the platform. The system may also include a lift having a fixed end coupled to the trailer bed and a lifting end coupled to the first portion of the platform.

In one or more embodiments a portable roof includes a trailer having at least one axle with rotatable wheels. The portable roof may also include a hitch coupler, the hitch coupler coupleable to a trailer hitch of a vehicle. The portable roof also includes a platform having an anti-slip upper surface and a lift coupled to the trailer and coupled to the platform, the lift configured to raise at least a portion of the platform to an inclined position.

By using a transportable roof safety training system, a roof safety instructor may quickly and easily transport the system to storm damaged locations to provide roof safety instruction and training on a realistic roof in a less dangerous environment as compared to using a roof on a building.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views unless otherwise specified. The sizes and relative positions of elements in the drawings are not necessarily drawn to scale. The shapes of various elements and angles are not necessarily drawn to scale either, and some of these elements are enlarged and positioned to improve drawing legibility. Further, each particular shape and positioning of an element as drawn is not intended to convey that said illustrated shape and position is the actual and only shape and position of the particular element; instead, said shapes and positions have been selected for ease of recognition in the drawings. One or more embodiments are described hereinafter with reference to the accompanying drawings.

FIG. 7 is a front view of a transportable roof safety training system according to one or more embodiments disclosed herein.

DETAILED DESCRIPTION

Figure 1:
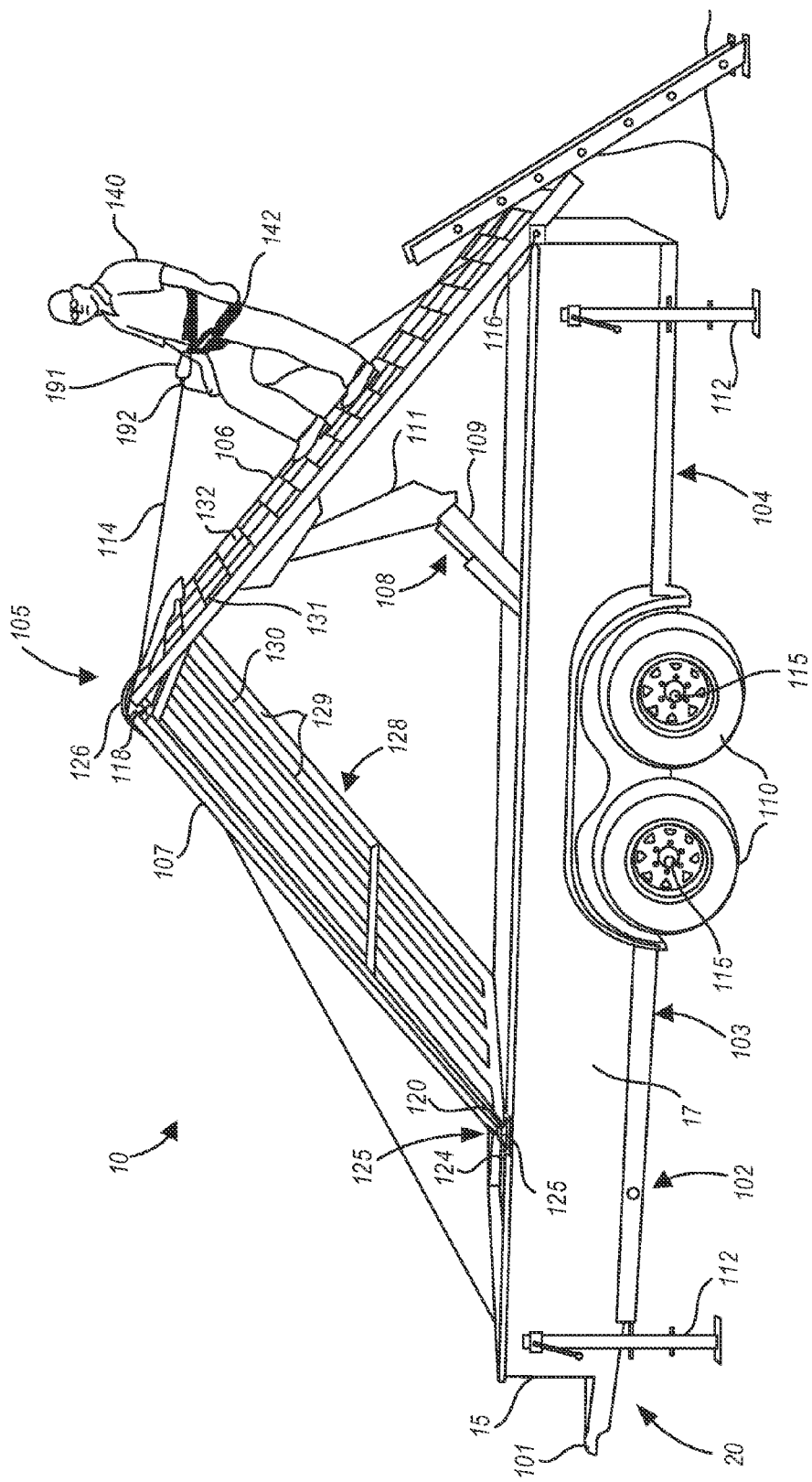
FIG. 1 is a side view of a transportable roof safety training system according to one or more embodiments disclosed herein.

FIG. 1 shows a side view of a transportable roof safety training system 10. The transportable roof safety training system 10 includes a platform 105 mounted to a trailer 20. The trailer 20 includes a trailer frame 15 with axles 115 mounted to a bottom of the frame 15. Wheels 110 are rotatably coupled to the axles 115. A front end 102 of the trailer 20 includes a trailer hitch coupler 101 that is configured to couple the transportable roof safety training system 10 to a vehicle.

The trailer 20 may also include stabilizing devices, such as jacks 112 for leveling and stabilizing the transportable roof safety training system 10 during use. The transportable roof safety training system 10 depicted in FIG. 1 includes four jacks 112. Two jacks 112 are located on the near side of the trailer 20, one at the front end 102 of the trailer 20 and one at a rear end 104 of the trailer 20. Two additional jacks are located on the far side of the trailer 20, one at the front end 102 of the trailer 20 and one at the rear end 104 of the trailer 20 (not shown).

The jacks 112 depicted in FIG. 1 are in an extended position so that they level and stabilize the transportable roof safety training system 10. The transportable roof safety training system 10 and, in particular, the trailer 20, should be level to reduce the likelihood of the system tipping during use. For example, when the platform 105 is in a raised position, as shown in FIG. 1, a user 140 walking on an unleveled trailer 20 may cause the trailer 20 to tip over if his body approaches a side of the trailer 20 because the user's weight may shift the center of gravity of the transportable roof safety training system 10 such that it tips over. By using jacks 112 to level the transportable roof safety training system 10 the weight of the user 140 remains over the trailer 20 and reduces the likelihood of the system 10 tipping over.

In addition to reducing the risk of tipping, leveling the trailer 20 and the transportable roof safety training system 10 allows the platform 105 to remain level from one side to the other such that the slope of the plane of a second portion 106 of the platform 105 is in one direction, for example sloping from the front of the trailer 20 to the back of the trailer 20. This sort of slope more closely simulates the slope of most roofs that slope in only one direction.

While in transport, the jacks 112 may be retracted such that they do not interfere with the movement of the transportable roof safety training system 10. In some embodiments, the jacks 112 may also rotate from the vertical arrangement shown in FIG. 1 to a horizontal arrangement. In some embodiments, the jacks may be removably coupled to the trailer 20 such that during transport the jacks 112 are decoupled from the trailer 20 and may be stowed for transport.

The trailer 20 and frame 15 may include a bed 103 that forms the base of the trailer 20. The frame 15 may also include sidewalls 17 that extend outward from the bed 103. As shown in FIG. 1, the sidewalls 17 extend upward and perpendicular to the plane of the bed 103.

The transportable roof safety training system 10 also includes a platform 105. The platform 105, as shown in FIG. 1, includes a first portion 107 and a second portion 106 rotatably coupled to each other via a hinge 118. The first portion 107 may be at the front end of the transportable roof safety training system 10 while the second portion 106 may be at the back end of the transportable roof safety training system 10. The hinge 118 allows the first portion 107 and second portion 106 to rotate relative to each other during the raising and lowering process, as discussed below.

The first portion 107 of the platform may slide on a track 124 or some other portion of the trailer frame 15 during the raising and lowering process. In the embodiment shown in FIG. 1, a first end of the first portion 107 is rotatably coupled to the second portion 106 and a second end of the first portion includes a roller 120, which may be a wheel that engages with the sidewall 17 of the trailer 20 and supports the second end of the first portion 107. The roller 120 also facilitates movement and rotation of the first portion relative to the trailer sidewall 17 during the process of raising and lowering the platform 105.

The transportable roof safety training system 10 also includes a stop 125. The stop 125 aids in locking the position of the second end of the first portion 107 to the sidewall 17 of the trailer 20. The stop 125 resists movement of the second end of the first portion 107 of the platform 105 and helps in preventing the platform from moving or changing position while a user 140 is using the transportable roof safety training system 10. The stop 125 is discussed in more detail below with respect to FIGS. 3A and 3B.

A first end of the second portion 106 of the platform 105 is rotatably coupled to the first portion 107 of the platform 105 while the second end of the second portion 106 is rotatably coupled to the trailer 20. For example, as depicted in FIG. 1, the second end of the second portion 106 is rotatably coupled to an upper end of the sidewall 17 via a hinge 116. The hinge 116 allows the platform to rotate relative to the trailer during the process of raising and lowering the platform 105. The hinge 116 is discussed in more detail below with respect to FIG. 2.

The platform 105 may include a support structure 128. The support structure 128 includes a frame 129 that takes the place of trusses or rafters in a real roof. The frame 129 supports sheathing 130 that forms the flat surface of the platform. The sheathing 130 may be plywood, other wood material, or metal. The top surface of the sheathing 130 may be covered with anti-slip material 132, such as an anti-slip coating or roofing shingles. Generally speaking, a material having "anti-slip" properties may be any material that resists a person standing or moving on the material from slipping. For example, any type of roofing shingles (e.g., asphalt shingles, cedar shingles, rubber shingles, metal shingles, and the like) or any other roofing material at all may be considered herein to be an anti-slip material, an anti-slip surface, an anti-slip coating, or a material having anti-slip properties.

The anti-slip material 132 allows the user 140 to securely place his feet on the surface 131 of the platform 105 during use. The user 140 is also secured via a safety system that may include a rope 114, a harness 142, couplings 191, knots 192, and a trailer attachment point 402 (see FIG. 7).

The user may wear the safety harness 142 while using the transportable roof safety training system 10. Any suitable harness may be used. The harness 142 may be a half-body, waist, or pelvic harness as depicted in FIG. 1 or may be a full body harness or a combination of a half-body harness and a chest harness.

The harness 142 is coupled to the rope 114 via a coupling 191 or a knot 192, or both. The coupling 191 may be a carabineer or a belay device, such as a FIG. 8, a stitch plate, a tubular device, or other suitable belay device. The knots may include a FIG. 8 knot, a bowline, munter hitch, or other suitable knot.

If using a belay device or a munter hitch in combination with a carabineer, the user 140 may use the rope 114 to support himself in many different positions on the platform 105 and demonstrate the safety procedures used for walking up and down and otherwise working on a roof.

The transportable roof safety training system 10 may also include a hinge cover 126. The hinge cover 126 helps to protect the rope 114 and aids in preventing pinching while raising or lowering the platform 105.

The rope 114, being secured at the front end of the trailer 20 is routed up and over the first portion 107 of the platform 105 and also over the hinge 118 and then back down the second portion 106 of the platform 105 to the user 140. The rope 114 may lie on or contact the ends of the first and second portions 106, 107 of the platform 105 near the hinge 118. During use, contact with the platform 105 may cause abrasion and wear on the rope 114 which can weaken the rope 114 and shorten its useful life. The hinge cover 126, which may include padding material such as closed cell foam covered by water resistant material, for example, tarpaulin, cushions the edges of the platform 105 and reduces the amount of abrasion and wear on the rope 114 as compared to a system that does not have a hinge cover 126.

By covering the hinge, the hinge cover 126 also aids in preventing pinching of a user's hands or other body parts and equipment during the raising and lower processes.

To demonstrate the various methods of safely working on roofs of different pitches, the transportable roof safety training system 10 can adjust the angle or inclination of the first and second portions 107, 106 of the platform 105. A lift 108 is used to raise and lower the platform 105 and adjust the pitch of the first and second portions 107, 106. The lift 108 includes a fixed end 109 that is coupled to the trailer bed 103, the trailer frame 15, or otherwise coupled to the trailer 20, and a lifting end 111 that is coupled to the platform 105.

The lift 108 may be an electrical, hydraulic, or manual lift. As depicted in FIG. 1, the lift 108 is a hydraulic lift that uses an electrically powered hydraulic motor to extend and retract a hydraulic piston system to raise and lower the platform 105. The lift 108 and the components of a lift system 200 are described in greater detail below with respect to FIG. 4.

Figure 2:
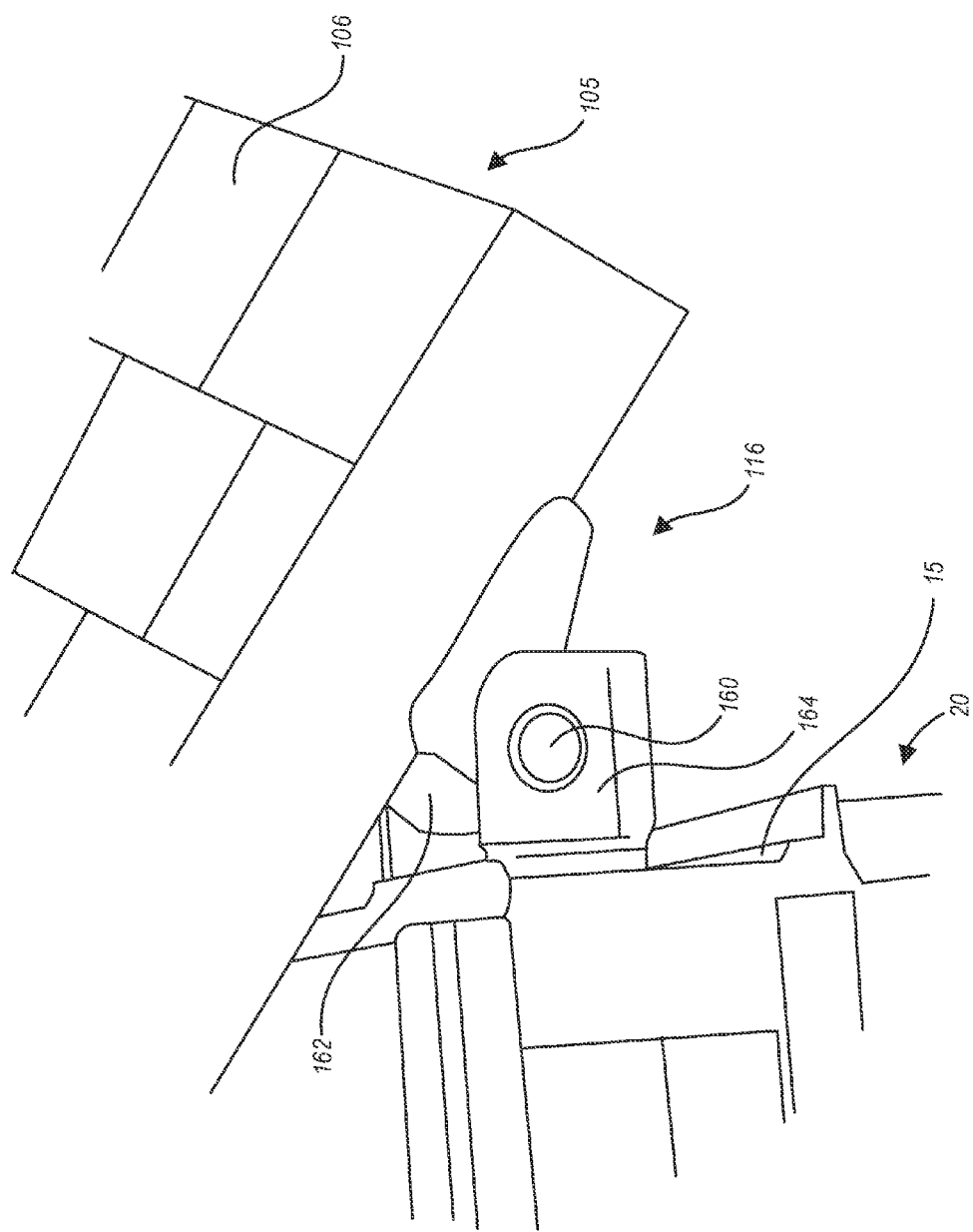
FIG. 2 is a detail view of a hinge of a transportable roof safety training system according to one or more embodiments disclosed herein.

FIG. 2 shows a detailed view of the hinge 116. As shown in FIG. 2, the hinge 116 rotatably couples the second portion 106 of the platform 105 to the frame 15 of the trailer 20. The hinge 116 includes a hinge frame 164 that is attached to the trailer frame 15, for example by welding or bolting the frame 164 of the hinge 116 to the frame 15 of the trailer 20. The hinge 116 also includes a knuckle 162 attached to the platform 105. The knuckle 162 rotates about a pin 160 that is coupled to the hinge frame 164.

The hinge 116 shown in FIG. 2 is one example of a hinge for rotatably coupling the platform 105 to the trailer 20. Other types of hinges, such as butt hinges, strap hinges, or other hinges may be used to rotatably couple the platform 105 to the trailer 20.

Figure 3:
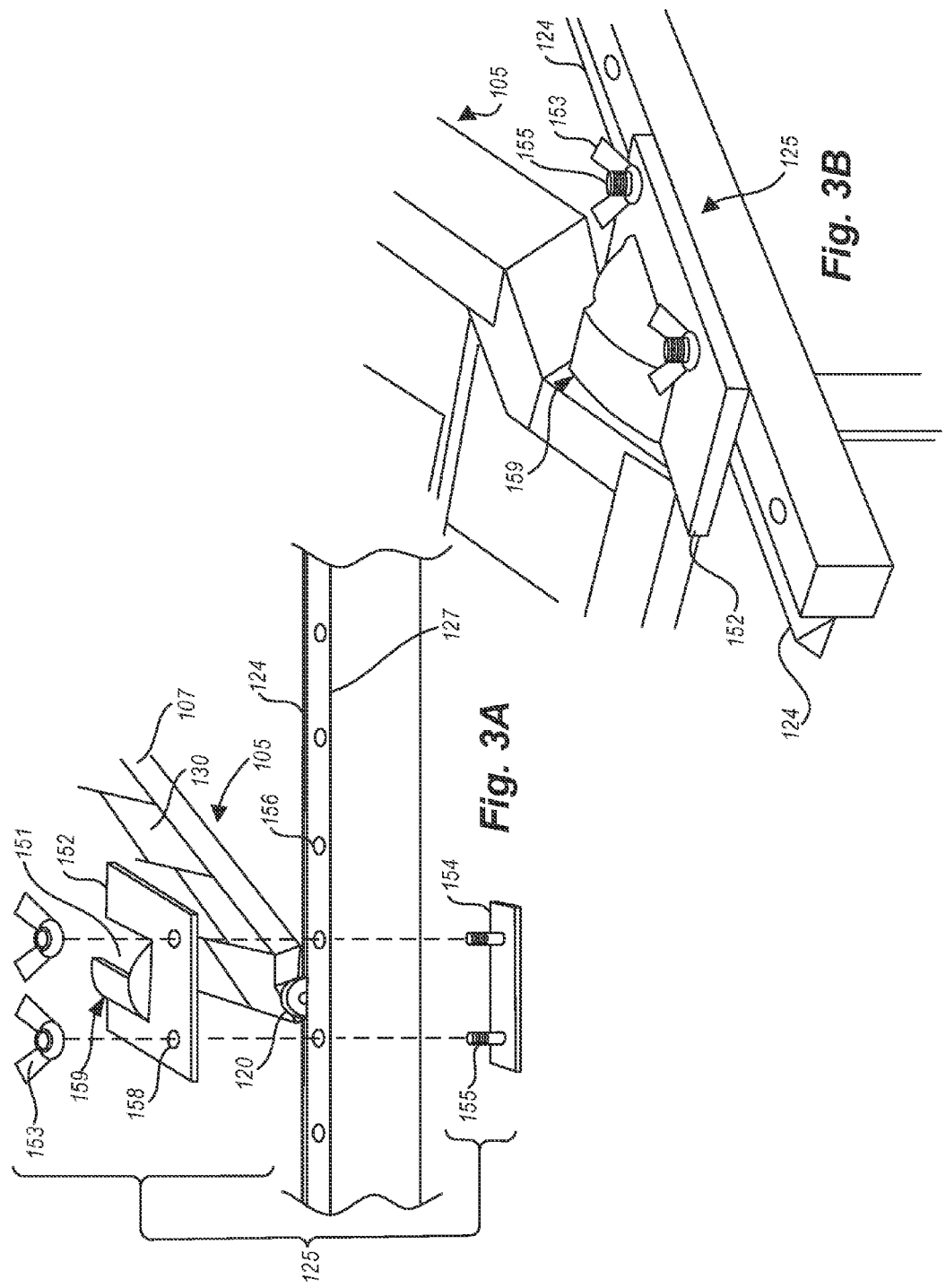
FIG. 3A is an exploded view of a roller stop of a transportable roof safety training system according to one or more embodiments disclosed herein.
FIG. 3B is a detailed view of an engaged roller stop of a transportable roof safety training system according to one or more embodiments disclosed herein.

FIG. 3A shows an exploded view of one non-limiting embodiment of a stop 125 and other associated parts of the transportable roof safety training system 10. The roller 120 supports the second portion 107 of the platform 105 on a track 124. The roller 120 may have a V-shaped profile that may engage with the track 124. In some embodiments, the track 124 may have a triangular profile that mates with the V-shaped profile of the roller 120. When the roller 120 is free to move, for example. when not locked in place with a stop 125, the roller 120 rolls along the track 124 as the platform 105 is raised and lowered between various positions.

When the platform 105 is in a desired position, a user may install the stop 125 to lock the platform 105 in place and resist movement of the platform 105. Locking the platform 105 in place with the stop 125 increases the safety of using the transportable roof safety training system 10. For example, although the platform 105 may be supported by the lift 108, should the lift 108 fail while a user 140 is using the transportable roof safety training system 10, for example, if a hydraulic hose ruptures, the stop 125 can support the platform 105 and prevent it from moving.

The stop 125 includes several parts, a fastening plate 154 with associated fasteners 155, a stop plate 152 with apertures 158 to receive the fastener 155, fasteners 153 that engage with the fasteners 155 and a cover member 159 that covers the wheel 120. The frame 15 of the trailer 20 may also include apertures 156 for receiving the fastener 155.

To secure the roller 120 with the stop 125, the platform 105 is positioned such that the roller 120 is between two adjacent frame apertures 156 on a flange 127. Although the transportable roof safety training system 10 is depicted as having frame apertures 156 that are spaced further apart from each other than the diameter of the roller 120, in some embodiments, the frame apertures 156 may be spaced closer together. In such an embodiments, the roller 120 is placed between two frame apertures 156, but the two frame apertures 156 may not be adjacent to each other.

Once the roller 120 is between two apertures 156, the fastening plate 154 is placed beneath the flange 127 and aligned with the apertures 156. In some embodiments, during alignment of the fastening plate 154 with the apertures 156, the fasteners 155 are placed through the apertures 156. In some embodiments, the fastening plate 154 may, itself, include apertures that are aligned with apertures 156 in the flange 127. In such embodiments, the fasteners 155 are placed through both the apertures in the fastening plate and the apertures 156 in the flange 127. The fasteners 155 may be bolts or another suitable fastening mechanism.

The stop plate 152 is aligned with the apertures 156 and also with the roller 120. Aligning the stop plate 152 with the apertures 156 may include aligning the apertures 158 of the stop plate 152 with the apertures 156. In some embodiments, the stop plate 152, rather than having apertures 158 may include fasteners. In such an embodiment, the fasteners are aligned with and inserted into the frame apertures 156.

To align the stop plate 152 with the roller 120, the cover member 159 is aligned with the roller 120. The wheel cover may include a notch 151 and cover member 159. In such embodiment, the notch 151 is placed around the roller 120. In particular, the perimeter of the notch 151 extends in front of and behind the roller 120 such that movement in either direction along the track 124 causes the roller to contact the perimeter of the notch 151 which resists further movement of the roller 120. The cover member 159 is configured to extend over at least a portion of the roller 120. By extending over at least a portion of the roller 120, the cover member 159 aids in preventing the roller 120 from rising up off the track 124 and escaping the stop 125. In some embodiments, the cover member 159 extends from a first edge of the perimeter of the notch 151 to a second edge of the perimeter of the notch 151, enclosing the top portion of the roller 120.

With the stop plate 152 and fastening plate 154 aligned with the frame apertures 156 and the roller 120, the fasteners 153 can be coupled to the fasteners 155 to fix the stop 125 to the trailer 20 and secure the platform 105 in position. The fasteners 155 may be bolts, such as shoulder bolts, and the fasteners 153 may be nuts, such as wing nuts.

In some embodiments, rather than using fasteners 155 attached to or through apertures in the fastening plate 154, the fasteners 155 may be placed directly through the apertures 156 in the frame 20 and the apertures 158 of the stop plate 152 without using a fastening plate 154.

FIG. 3B shows a detailed view of the stop 125 securing the roller 120 and the first portion 107 of the platform 105 to the trailer 20.

Figure 4:
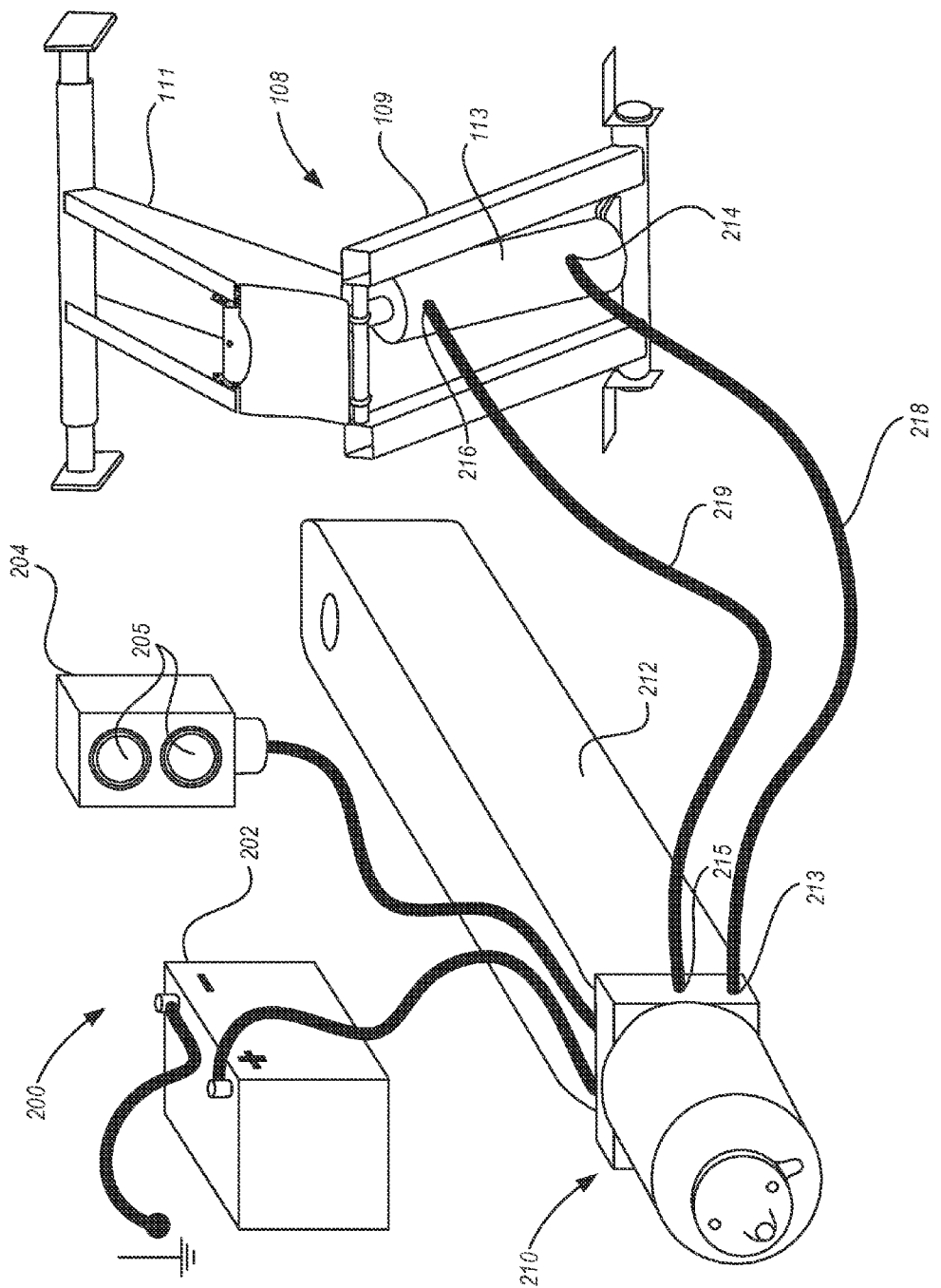
FIG. 4 is a schematic view of a lift system according to one or more embodiments disclosed herein.

FIG. 4 shows a diagram of an embodiment of a lift system 200. The lift system 200 includes a power supply 202, a controller 204, a lift 108, and motor 210, which may also include a pump, and a hydraulic reservoir 212. The power supply 202 may be an electrical power source, such as a battery, generator, or vehicle alternator. The power supply 202 provides power to the motor 210. The motor 210 may include a hydraulic pump that is in fluid communication with the hydraulic reservoir 212. A controller 204, which may be a hand controller, includes one or more switches 205 to control the operation of the motor 210. For example a first switch of the one or more switches 205 may cause the motor 210 and associated pump to operate in a first direction whereby hydraulic fluid is pumped out of the pump at orifice 213, through hydraulic line 218 and into orifice 214 of an actuator 113 of the lift 108.

The lift 108 includes a fixed end 109 that may be coupled to the trailer 20 and a lifting end 111 that is coupled to the platform 105. The lift 108 may also include an actuator 113. The actuator 113 includes a first end coupled to the fixed end 109 of the lift 108 and a second end that is coupled to the lifting end 111 of the lift 108. In the embodiment shown in FIG. 4, the actuator 113 is a hydraulic actuator and the first end is a rod attached to a piston and the second end is a barrel or cylinder.

Pumping hydraulic fluid into orifice 214 fills the lower end of the barrel, forces the piston up, causing the rod to extend and lift the lifting end 111 of the lift 108, thereby causing the attached platform, such as platform 105 to move. As the piston and rod move, hydraulic fluid is forced out of the upper end of the actuator 113 and back into the pump or the reservoir 212 via line 219 and orifice 215.

Pushing a second switch of the one or more switches 205 of the controller 204 may cause the motor 210 and pump to operate in a second direction whereby hydraulic fluid is pumped out of the pump at orifice 215, through hydraulic line 219 and into orifice 216. Pumping hydraulic fluid into orifice 216 fills the upper end of the barrel and forces the piston down and causes the rod to retract and lower the lifting end 111 of the lift 108, thereby causing the attached platform 105 move. As the piston and rod move, hydraulic fluid is forced out of the lower end of the actuator 113 and back into the pump or the reservoir 212.

Other types of lift systems may be used. For example, in some embodiments, the actuator may be a mechanical actuator, such as ball screw, lead screw, screw jack, or other actuator.

Although the control 204 is depicted as wired, in some embodiments, the control 204 may be wireless.

Figure 5:
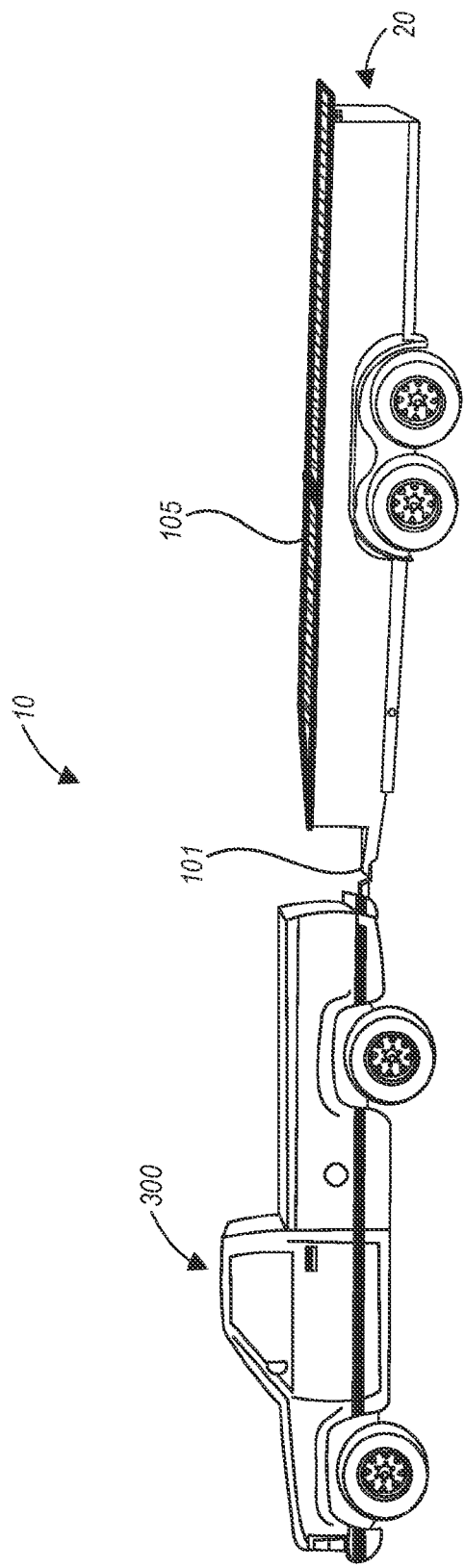
FIG. 5 is a side view of a transportable roof safety training system according to one or more embodiments disclosed herein.

FIG. 5 shows the transportable roof safety training system 10 in a transport configuration. The platform 105 is in a substantially flat position on the trailer 20 and the trailer hitch coupler 101 is coupled to a trailer hitch on a towing vehicle 300. In this configuration the towing vehicle 300 may transport the transportable roof safety training system 10 to, from, or between training locations.

To transition from a training configuration, such as shown in FIG. 1, to a transport configuration, such as shown in FIG. 5, the stop 125 is removed to allow the roller 120 and the platform 105 to move. The lift system 200 is activated to cause the lift 108 to move such that the lifting end 111 of the lift moves downward and the platform 105 transitions from an inclined position, such as shown in FIG. 1, to a transport position, which may be a substantially flat position, as shown in FIG. 5. When the platform is in the transport position the stop 125 may be coupled to hold the platform in the transport position.

The jacks 112 may be retracted or removed from the frame 20 and the hitch coupler 101 can be coupled to a trailer hitch of the towing vehicle 300.

Figure 6:
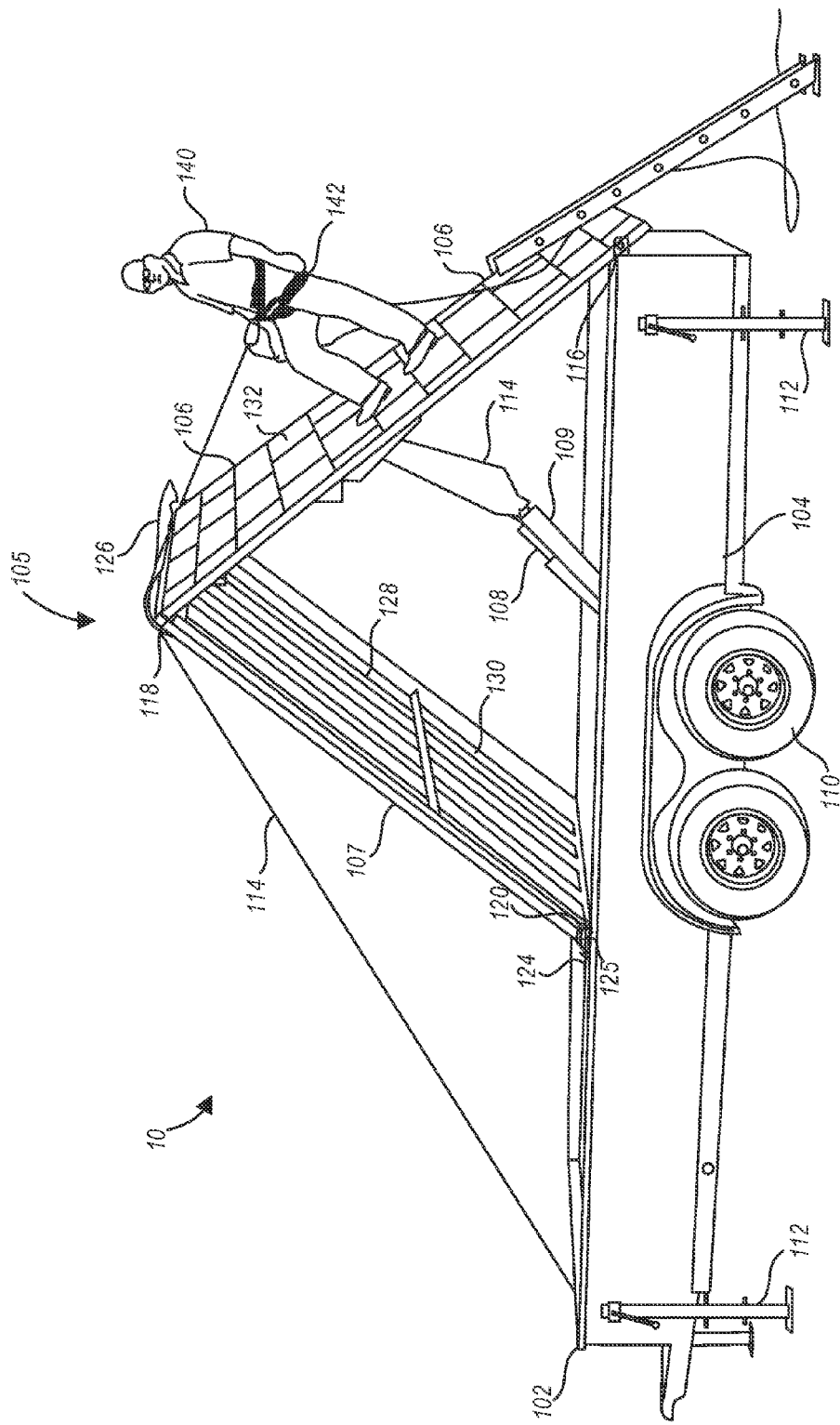
FIG. 6 is a side view of a transportable roof safety training system according to one or more embodiments disclosed herein.

Similar steps may be carried out to transition the transportable roof safety training system 10 from a transport configuration, for example, as shown in FIG. 5, to a training configuration, for example, as shown in FIG. 6.

The jacks 112 may be attached to the frame 20 and extended to level the transportable roof safety training system 10 and the hitch coupler 101 can be decoupled from the trailer hitch of the towing vehicle 300.

If a stop 125 was installed to hold the platform 105 in the transport position, then the stop 125 can be removed. Once the stop is removed, the lift system 200 may be activated to transition the platform 105 from the transport position to a training position, for example, as shown in FIG. 6. During the transition, the roller 120 may roll along the track 124 until the roller 120 is positioned between frame apertures 156 at which point the stop may be installed to lock the platform in the training position.

As shown in FIG. 6, as compared to FIG. 1, the platform 105 is positioned at a steeper angle to aid in training users in how to work on steep roofs. Using a trailer 20 with multiple frame apertures 156 (see FIG. 3A) allows the installation of the stop 125 in multiple different positions which, in turn, allows the platform to be held in place at multiple different angles.

FIG. 7 shows a front view of the transportable roof safety training system 10 and the system for attaching the rope 114 to the trailer 20. The rope 114 is coupled to an attachment point 402 on the trailer 20 via a coupling 404 or a knot 406, or both. The coupling 404 may be a carabineer or a belay device, such as a FIG. 8, a stitch plate, a tubular device, or other suitable belay device. The knots may include a FIG. 8 knot, a bowline, munter hitch, or other suitable knot.

In some embodiments, for example, when the user 140 is attached to the rope 114 via a belay device or belay knot, the other end of the rope 114 may be attached to the attachment point with a fixed knot, such as a FIG. 8 or a bowline. In some embodiments, an instructor may wish to belay the user 140. In such an embodiment, the user 140 may be attached to the rope with a fixed knot while the other end of the rope 114 is attached to the trailer with a belay device or belay knot, such as a munter hitch.

Although the platform 105 is depicted as having two portions, in some embodiments the platform 105 may have a single portion with a first end attached to the trailer via a hinge 116. In such an embodiment the lift 108 may hold the platform in position during use.

The various embodiments described above can be combined to provide further embodiments. Aspects of the embodiments can be modified, if necessary to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A transportable roof safety training system, comprising:
a trailer, the trailer including:
a trailer frame, the trailer frame having a front end and a rear end;
a trailer bed integrated with the trailer frame;

at least one axle having wheels rotatably mounted thereon, the at least one axle affixed to the trailer frame; and a hitch coupler attached to the front end of the trailer frame and configured to couple to a trailer hitch;

a platform including a first portion and a second portion, the first portion having a first end rotatably coupled to the second portion and the first portion having a second end rotatably coupled to the trailer;

roofing material mounted to an upper surface of the platform; and a lift having a fixed end coupled to the trailer and a lifting end coupled to a the first portion of the platform.

2. The transportable roof safety training system of claim 1, further comprising:

a track extending from a front end of the trailer bed towards a rear end of the trailer bed, the track configured to engage with and support the second portion of the platform.

3. The transportable roof safety training system of claim 2, wherein the second portion of the platform includes:

at least one roller rotatably coupled thereto, the at least one roller configured to engage with the track.

4. The transportable roof safety training system of claim 1, further comprising:

one or more jacks coupled to the trailer, the jacks configured to cooperatively level the trailer.

5. The transportable roof safety training system of claim 1, wherein the lift includes:

a hydraulic system to extend the lifting end of the lift and move the first portion of the platform from a first position to an inclined second position.

6. The transportable roof safety training system of claim 5, wherein at the first position, the first portion of the platform is in a substantially horizontal position and at the second position, the first portion of the platform is inclined with respect to the substantially horizontal position.

7. The transportable roof safety training system of claim 3, further comprising:

at least one roller stop configured to releasably engage with the at least one roller and to resist movement of the at least one roller along the track.

8. The transportable roof safety training system of claim 1, further comprising:

a safety line; and a safety line attachment coupled to the trailer and configured to receive the safety line.

9. The transportable roof safety training system of claim 8, wherein a first end of the safety line is engaged with the safety line attachment and a second end of the safety line is engaged with a safety harness to support a person on the upper surface of the platform.

10. A portable roof comprising:

a trailer having at least one axle, the at least one axle having rotatable wheels coupled thereto;

a hitch coupler attached to the trailer, hitch coupler coupleable to a trailer hitch of a vehicle;

a platform having an anti-slip upper surface; and a lift coupled to the trailer and coupled to the platform, the lift configured to raise at least a portion of the platform to an inclined position, wherein the platform is articulated into at least two inclined sub-platforms when the lift is operated.

11. The portable roof of claim 10, wherein the anti-slip upper surface of the platform includes:

a layer of asphalt roofing shingles.

12. The portable roof of claim 10, wherein the anti-slip upper surface of the platform includes:

anti-slip tread tape.

13. The portable roof of claim 10, wherein the anti-slip upper surface of the platform includes:

an anti-slip coating.

14. The portable roof of claim 10, wherein the anti-slip upper surface of the platform is substantially planar and a first end of the platform is rotatably coupled to the trailer.

15. A method to operate a transportable roof safety training system, the method comprising:

inclining two sub-platforms of a platform between a substantially horizontal first position and a raised second position, the platform having a first end and a second end opposite the first end, the first end of the platform rotatably coupled to a trailer, and the platform being articulated between the two sub-platforms;

temporarily affixing the platform in the raised second position;

engaging a first end of a safety line with a safety line attachment that is coupled to the trailer;

engaging a second end of the safety line with a safety harness; and supporting a person on an upper surface of the inclined platform with the safety line and the harness.

16. The method to operate the transportable roof safety training system of claim 15, further comprising:

leveling the trailer by adjusting one or more jacks coupled to the trailer.

17. The method to operate the transportable roof safety training system of claim 15, wherein the safety line attachment is directly coupled to the trailer.

18. The method to operate the transportable roof safety training system of claim 15, wherein temporarily affixing the platform in the second position includes:

engaging a mechanical stop to temporarily couple the platform to the trailer to resist movement of the platform.

19. The method to operate the transportable roof safety training system of claim 15, wherein, inclining the platform between the substantially horizontal first position and the raised second position includes:

actuating a lift, the lift having a fixed end coupled to the trailer and a moveable end coupled to the platform, the moveable end moving with respect to the fixed end when the lift is actuated.

\* \* \* \* \*